March 16, 1948.  M. D. DUHAIME  2,438,040
HYDRAULIC WHEEL DRIVE
Filed Aug. 8, 1944  4 Sheets-Sheet 1

Inventor
MARSHALL D. DUHAIME,

By *Clarence A. O'Brien and Harvey B. Jacobson*
Attorneys

March 16, 1948. M. D. DUHAIME 2,438,040
HYDRAULIC WHEEL DRIVE
Filed Aug. 8, 1944 4 Sheets-Sheet 4

Inventor
MARSHALL D. DUHAIME,
By Clarence A. O'Brien
and Harvey B. Jacobson
Attorneys Patented Mar. 16, 1948

2,438,040

UNITED STATES PATENT OFFICE 2,438,040

HYDRAULIC WHEEL DRIVE

Marshall D. Duhaime, White Plains, N. Y.

Application August 8, 1944, Serial No. 548,597

1 Claim. (Cl. 74—189.5)

This invention appertains to new and useful improvements in hydraulic car fluid drive vehicle wheels, the principal object being to provide a hydraulic drive to each wheel of a vehicle or to only the rear wheels.

Another important object of the invention is to provide a hydraulic drive for the rear wheels of vehicles for the purpose of eliminating the usual differential.

Still another important object of the invention is to provide fluid drive connections between drive axles and driven wheels for the purpose of taking care of any differential in resistance or action between the drive axle and the corresponding wheel or wheels.

Other objects and advantages of the invention will become apparent to the reader of the following description.

Figure 1:
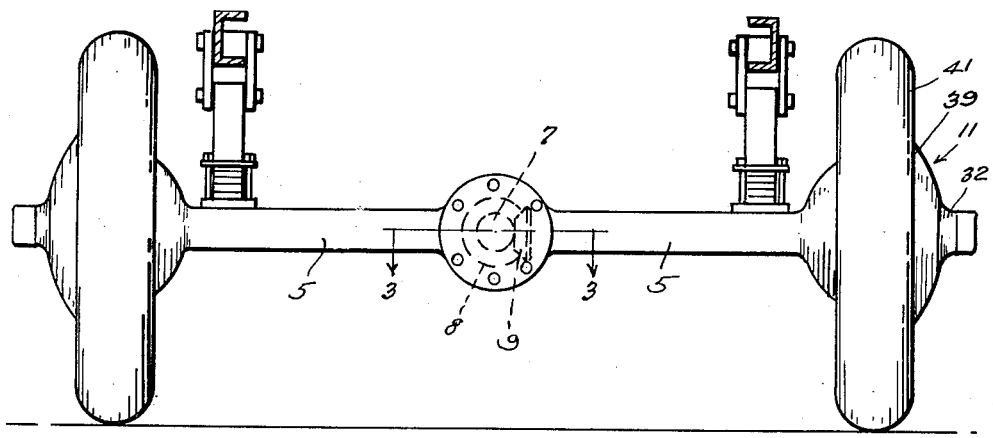
Figure 1 is a rear elevational view showing a fluid drive equipped rear wheels of a vehicle.
Figures 2, 3:
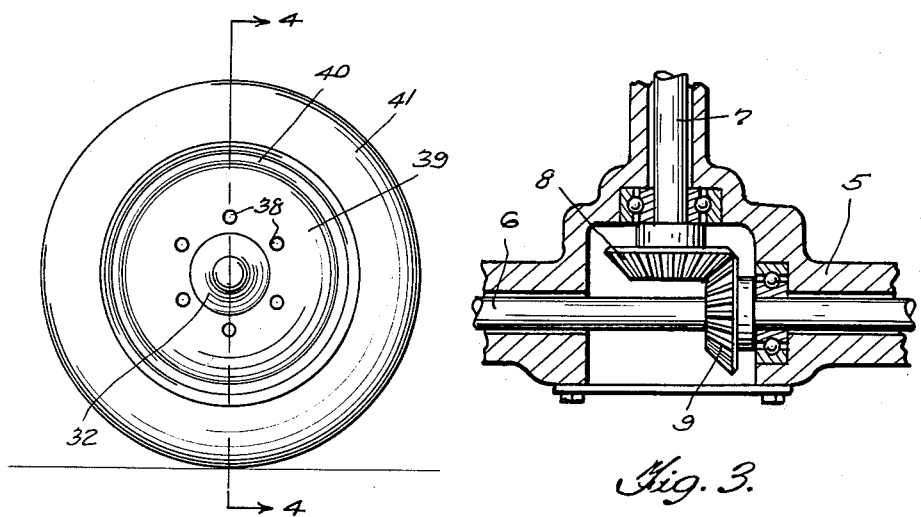
Figure 2 is an end elevational view of the assembly shown in Figure 1.
Figure 3 is a fragmentary sectional view showing the simple gearing between the drive shaft and axle.
Figure 4:
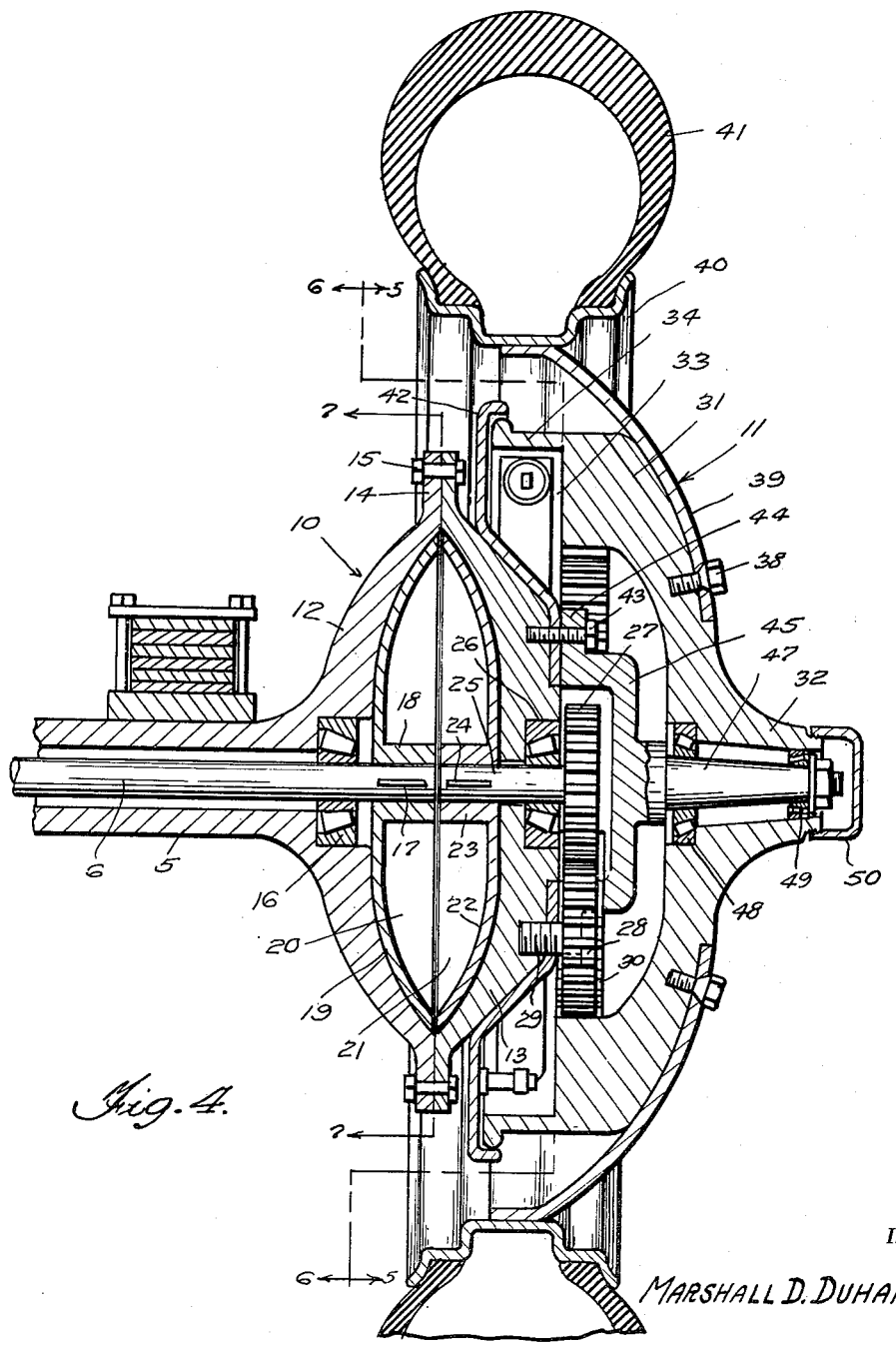
Figure 4 is a fragmentary enlarged vertical sectional view taken on the line 4—4 of Figure 2.
Figure 5:
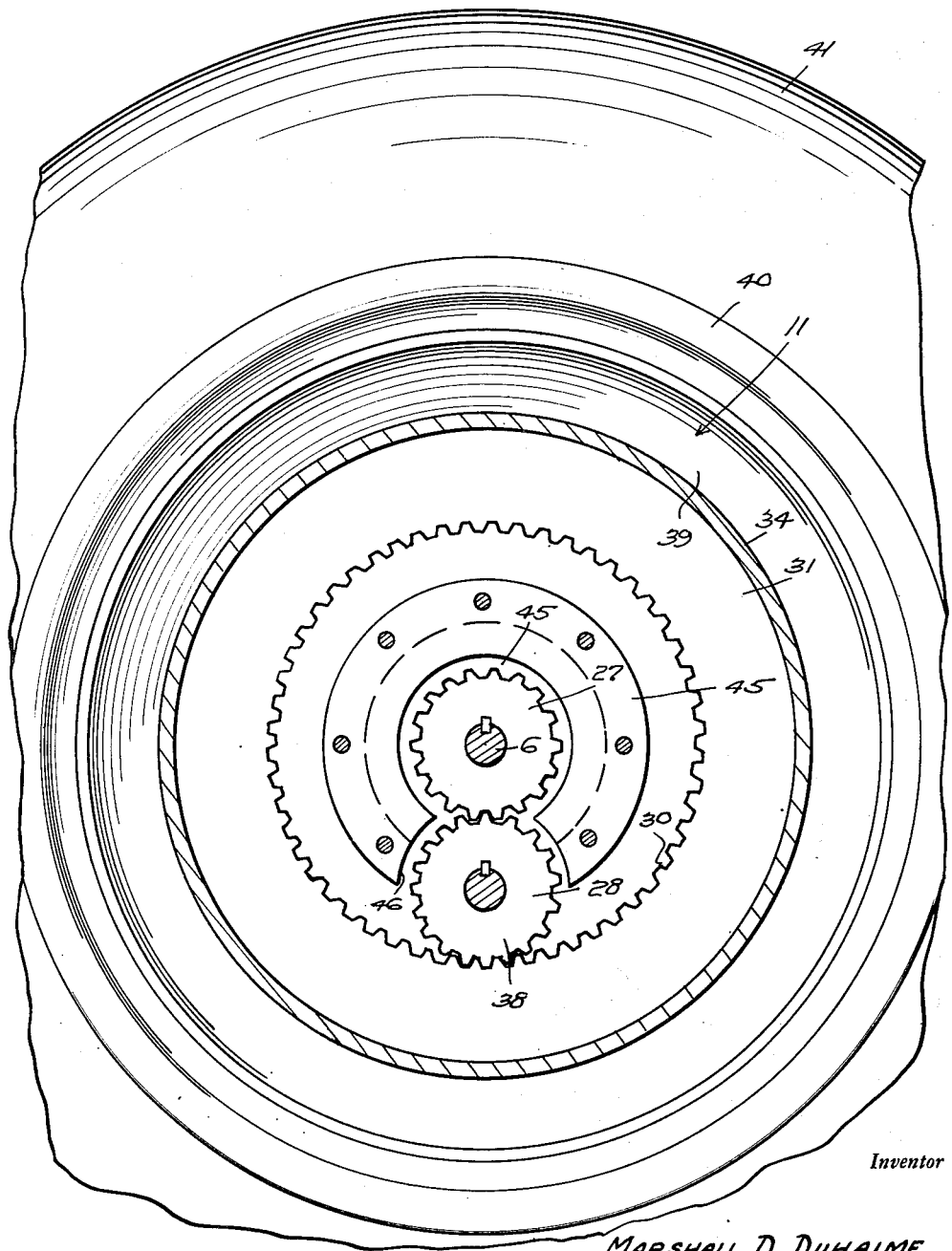
Figure 5 is a fragmentary vertical sectional view taken on the line 5—5 of Figure 4.
Figure 6:
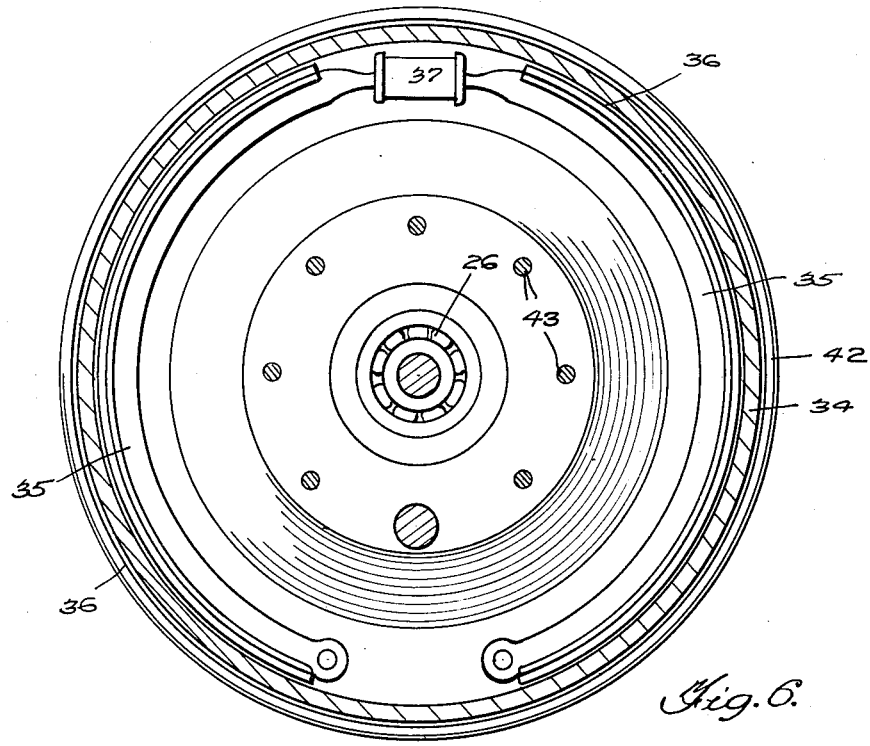
Figure 6 is a vertical sectional view taken on the line 6—6 of Figure 4.
Figure 7:
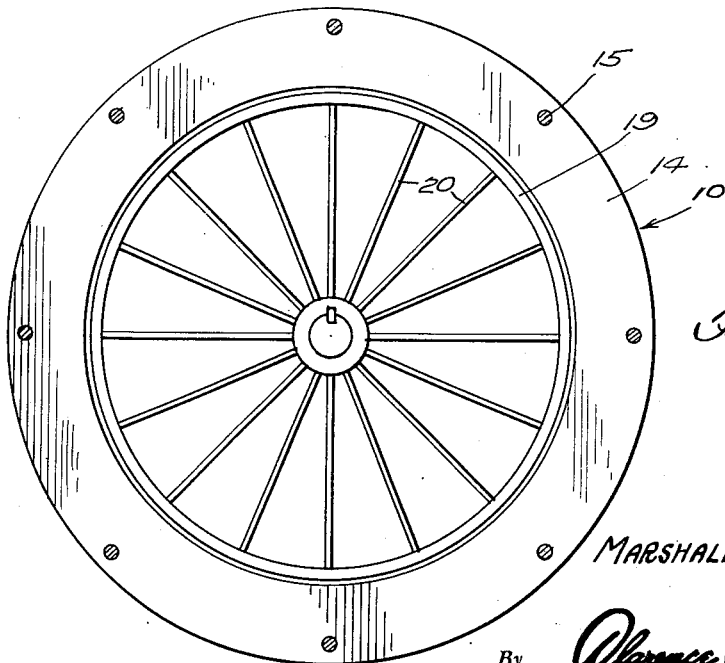
Figure 7 is a section taken on the line 7—7 of Figure 4.

Referring to the drawings wherein like numerals designate like parts, it can be seen that while the drive can be used for four wheel driven vehicles, its adaptation is limited in the illustrations here to the rear wheels of a vehicle (see Figure 1). Numeral 5 denotes a rear axle housing through which a rear axle 6 is disposed. A drive shaft 7 extending from the usual power plant (not shown) is equipped with a bevel gear 8 meshing with a bevel gear 9 fixed on the main axle 6.

A fluid drive connection generally referred to by numeral 10 and a wheel assembly generally referred to by numeral 11 are provided at each end of the main axle 6. The wheel has an open central portion and the wheel drive is located substantially within said portion.

Each fluid drive connection 10 consists of a substantially curved, dish-shaped shell 12 opposed to a similar shell 13, these shells 12 and 13 being flanged at their peripheries as at 14 and bolted together as at 15. The shell 12 is a part of an extension of the axle housing 5 and contains a bearing assembly 16 for the main axle 6. The axle 6 terminates within the shell 12 and is keyed as at 17 to the hub 18 of an impeller forming one of the hydraulic fluid drive members and consisting of a dish-shaped structure 19 having internal radially disposed similar vanes 20 opposed to vanes 21 being part of a similarly-shaped hydraulic fluid drive member 22 which has a hub 23 keyed as at 24 to a transmitting stub shaft 25 in axial alignment with the main axle 6. The shell 13 contains a bearing assembly 26 for the transmitting stub shaft 25 and on the outer end of the stub-shaft 25 is an idler gear 27 which meshes with a gear 28 rotatably mounted on stud 29, this gear 28 being in mesh with a ring-gear 30 at the inside of a hub structure 31 which is preferably provided with an outwardly projecting central nose portion 32 and a recess 33 at its inner side defining a brake drum 34 against which pivotal brake arms 35, 35 carrying linings 36 are engageable and forced in place by the action of a hydraulic cylinder 37.

Secured by bolts 38 to the hub structure 31 is a curved wheel body 39 secured at its periphery to a rim structure 40 on which a tire 41 is mounted.

An annular wall structure 42 is secured on the shell 13 and has a portion overlapping the inner end of the drum 34. Screws 43 secure the wall 42 in place and these screws pass through a flange 44 of a wheel carrier 45 surrounding the gear 27, this wheel carrier having a cut-away portion 46 to accommodate the gear 28.

Projecting outwardly from the wheel carrier 45 is a wheel supporting stub shaft 47 for the hub structure 31 of the wheel. The hub structure 31 contains bearing assemblies 48, 49 into which the wheel supporting stub shaft 47 is disposed. A cap 50 is provided for the outer end of the nose portion 32 of the hub structure 31. The wheel supporting stub shaft 47, the stub shaft 25 and the axle 6 are aligned along the same axis line which passes through the center of the wheel.

It can be seen, that instead of having the usual differential gearing for the rear wheels or a planetary gear drive replacing the same, the drive is from a single rear axle shaft 6 to the countershaft 25 and from there by way of the gears 27 and 28 to the ring gears 30 and wheel assemblies 11. This action taking place by the fluid drive connection between the impellers 20, 21.

This construction has moreover the advantage of being a compact structure which may fill approximately the central portion of the wheel so that no separate structure need be carried by the drive axle and its housing.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A vehicle wheel drive for the transmission of power from a drive shaft of a vehicle to a wheel, comprising a wheel having an open central portion, a main drive axle, a fixed housing for carrying and journalling the same, an extension on the end of said housing, consisting of curved shells and located within and close to the open central portion of the wheel, hydraulic fluid drive members within said shells, one of said members fixed on the end of the main drive axle, a transmitting stub shaft, aligned with the axle, freely rotatable within said extension and carrying the other hydraulic fluid drive member, a wheel carrier having a wheel supporting stub shaft attached to said housing extension with the last named stub shaft axially aligned with the transmitting stub shaft and axle along the axis of the wheel, a hub structure carrying the wheel and journalled on the wheel supporting stub shaft, a gear wheel centered on and attached to the transmitting stub shaft, a further gear wheel attached to the hub structure having its center in the axis of the wheel and a freely rotatable eccentric transmission gear wheel carried by the extension of the housing, engaging the two gear wheels centered on the wheel axis.

MARSHALL D. DUHAIME.

REFERENCES CITED

The following references are of record in the file of this patent:

UNITED STATES PATENTS

| Number | Name | Date |
|---|---|---|
| 1,305,531 | Farmer | June 3, 1919 |
| 1,316,057 | Parker | Sept. 16, 1919 |
| 1,438,051 | Moakler | Dec. 5, 1922 |
| 2,335,544 | Schnetzer | Nov. 30, 1943 |
| 2,392,520 | Benz et al. | Jan. 8, 1946 |

FOREIGN PATENTS

| Number | Country | Date |
|---|---|---|
| 285,970 | Great Britain | Feb. 23, 1928 |